United States Patent
Bentkovski

(10) Patent No.: US 10,232,996 B2
(45) Date of Patent: Mar. 19, 2019

(54) DEVICE FOR REMINDING A USER TO DRINK FROM A CONTAINER

(71) Applicant: WaterIO Ltd.

(72) Inventor: Yakov Bentkovski, Ness Ziona (IL)

(73) Assignee: WaterIO LTD., Ness Ziona (IL)

( * ) Notice: Subject to any disclaimer, the term of this patent is extended or adjusted under 35 U.S.C. 154(b) by 322 days.

(21) Appl. No.: 14/956,987

(22) Filed: Dec. 2, 2015

(65) Prior Publication Data

US 2017/0158388 A1 Jun. 8, 2017

Related U.S. Application Data

(60) Provisional application No. 62/087,435, filed on Dec. 4, 2014.

(51) Int. Cl.
| | |
|---|---|
| *G08B 1/00* | (2006.01) |
| *B65D 51/24* | (2006.01) |
| *G08B 21/24* | (2006.01) |
| *G09B 5/04* | (2006.01) |
| *G09B 19/00* | (2006.01) |
| *A47G 23/16* | (2006.01) |
| *A61J 7/04* | (2006.01) |
| *B65D 47/06* | (2006.01) |

(52) U.S. Cl.
CPC ........... *B65D 51/248* (2013.01); *A47G 23/16* (2013.01); *A61J 7/04* (2013.01); *G08B 21/24* (2013.01); *G09B 5/04* (2013.01); *G09B 19/0092* (2013.01); *B65D 47/06* (2013.01)

(58) Field of Classification Search
CPC .. B65D 51/248; B65D 51/245; B65D 41/048; B65D 41/04; G08B 21/20; G08B 21/24; A61J 7/0409; A61J 7/0407

USPC ....... 340/309.7, 604, 309.16, 309.8; 700/240
See application file for complete search history.

(56) References Cited

U.S. PATENT DOCUMENTS

| | | | |
|---|---|---|---|
| 2007/0222619 A1* | 9/2007 | Moran | ............. G01F 1/075 340/573.1 |
| 2014/0367291 A1 | 12/2014 | Lopez | |
| 2015/0122688 A1 | 5/2015 | Dias et al. | |

(Continued)

FOREIGN PATENT DOCUMENTS

| | | |
|---|---|---|
| CN | 203909488 | 10/2014 |
| TW | 200742710 | 11/2007 |

*Primary Examiner* — Toan N Pham
(74) *Attorney, Agent, or Firm* — Pearl Cohen Zedek Latzer Baratz LLP

(57) ABSTRACT

Disclosed is a device for reminding a user to drink from a container. The device may be attached to either the cap of the container or may be assembled inside the cap of the container. The device includes a housing, a battery, a printed circuit board, a battery holder, a button, an upper cover, a controller for storing a reference time, a reference timeout value and generating reminding signals, at least one output unit connected to the printed circuit board to produce output signals on receiving reminding signals from the controller, a tap button placed in the indent to meet the button on receiving tap from the user. Further, the controller stores the reference time on receiving the tap from the user and generates reminding signals for the user to drink from the container when the user fails to either tap the button again or remove the button from the spout in duration of the stored reference timeout value from the reference time.

12 Claims, 6 Drawing Sheets

(56) References Cited

U.S. PATENT DOCUMENTS

| | | | |
|---|---|---|---|
| 2016/0025545 A1* | 1/2016 | Saltzgiver | G01F 23/263 73/304 C |
| 2016/0180690 A1* | 6/2016 | Bentkovski | B65D 51/248 340/604 |
| 2016/0297583 A1* | 10/2016 | Staeben | F21V 33/004 |

* cited by examiner

DEVICE FOR REMINDING A USER TO DRINK FROM A CONTAINER

CROSS REFERENCE TO RELATED PATENT APPLICATION

This non-provisional application takes priority from U.S. Provisional Application No. 62/087,435 filed on Dec. 4, 2014 and incorporates the entirety of same by reference herein.

BACKGROUND OF THE INVENTION

1. Field of the Invention

The present invention generally relates to a reminder system, and more specifically relates to a device configured in the container for reminding a user to drink.

2. Description of Related Art

Water is crucial to the human being. Every system in the body depends on water. The human body made up of between 55 and 75 percent water, is in need of timely water replenishment. Lack of water can lead to dehydration, a condition that occurs when someone does not have enough water in his/her body to carry on normal functions. Even mild dehydration—as little as a 1 percent to 2 percent loss of the body weight—can exhaust the energy and make the person tired.

Dehydration poses a particular health risk for the very young and the very old. Signs and symptoms of dehydration includes but not limited to excessive thirst, fatigue, headache, dry mouth, little or no urination, muscle weakness, dizziness etc. People seem to carry bottled water everywhere they go. Health practitioners all over the world suggest drinking of eight glasses water a day.

Though people of different ages and weight may require drinking different amount of water per day, as there are plenty of other reasons to drink water. The major reasons for drinking water includes maintaining the balance of body fluids, controlling calories, energizing muscles, maintaining skin quality, and helping kidneys.

It is has been widely noted that people forget to drink water on regular basis. In order to remind people of the need to regularly and consistently drink water, health care provider recommends people to use an alarm or watch. Therefore there is a need of a device attached with the container to remind about drinking water at regular interval of times.

SUMMARY OF THE INVENTION

In accordance with the teachings of the present invention, a clip-on device attached to a cap of a container for reminding a user is provided.

An object of the present invention is to provide the clip-on device attached to the cap of the container for reminding a user. The clip-on device includes a bottom cover placed on the top of the cap of the container, a battery holder placed on top of the bottom cover, a battery placed in the battery holder, a printed circuit board attached to the battery holder, a button placed on the printed circuit board.

Further, the clip-on device includes a controller placed on the printed circuit board for storing a reference time, a reference timeout value and generating reminding signals. Furthermore, the clip-on device includes an upper cover housing the battery holder, the battery, the printed circuit board, the button, the controller; the upper cover attached to the bottom cover; further the upper cover including an indent.

Furthermore, the clip-on device includes a tap button placed in the indent to meet the button on receiving a tap from the user, wherein the controller stores the reference time on receiving the tap from the user and at least one output unit connected to the printed circuit board to produce output signals on receiving reminding signals from the controller.

Further, the controller generates the reminding signals for the user to drink from the container, when the user fails to tap the tap button again in duration of the stored reference timeout value from the reference time, and the user partially removes the upper cover to access the spout of the container.

Another object of the present invention is to facilitate the user to close the cap of the container through the tap button, resulting in tapping on the button by the user every time at the time of closing of the cap of the container. Further, includes one or more grooves on the lower circumference to provide flexible movement of the upper housing while opening and closing of the cap of the container.

Another object of the present invention is to provide one or more sensors for sensing environmental conditions of the housing. Further, the stored reference timeout value varies according to the environmental conditions reflecting on the upper cover as sensed by the one or more sensors.

Another object of the present invention is to provide a clip-on device wherein the output unit includes at least one of an audio unit connected to the PCB to generate audio signals on receiving reminder signals from the controller; one or more light emitting sources connected to the printed circuit board to illuminate on receiving reminder signals from the controller; and a vibration unit connected to the printed circuit board to produce vibration signals on receiving reminder signals from the controller.

Another object of the present invention is to provide in-cap device detachably attached to the container for reminding a user. The in-cap device includes a hollow sealing lock for receiving the spout from the hollow portion, a button placed inside the hollow portion of the sealing lock to meet the spout, a printed circuit board placed on the button, and a battery connected to the printed circuit board, a battery holder for holding the battery.

Further, the in-cap device includes a controller connected to the printed circuit board for storing a reference time when the user closes the sealing lock to allow the button to meet the spout, further storing a reference timeout value and generating reminding signals.

Furthermore, the in-cap device includes an upper cover attached to the container for covering the spout, the sealing lock, the battery holder, the battery, the printed circuit board and the button; and an output unit connected to the printed circuit board for producing output signals on receiving reminding signals from the controller; wherein, the controller generates reminding signals when the user fails to remove the sealing lock along with the button from the spout again in duration of the stored reference timeout value from the reference time.

Further, the user removes the upper housing along with the sealing lock to access the spout for drinking from the container. Another object of the present invention is to provide the in-cap device with one or more sensors, one or more light emitting sources, an audio unit and a vibration unit.

These and other features and advantages will become apparent from the following detailed description of illustra-

Figure 1:
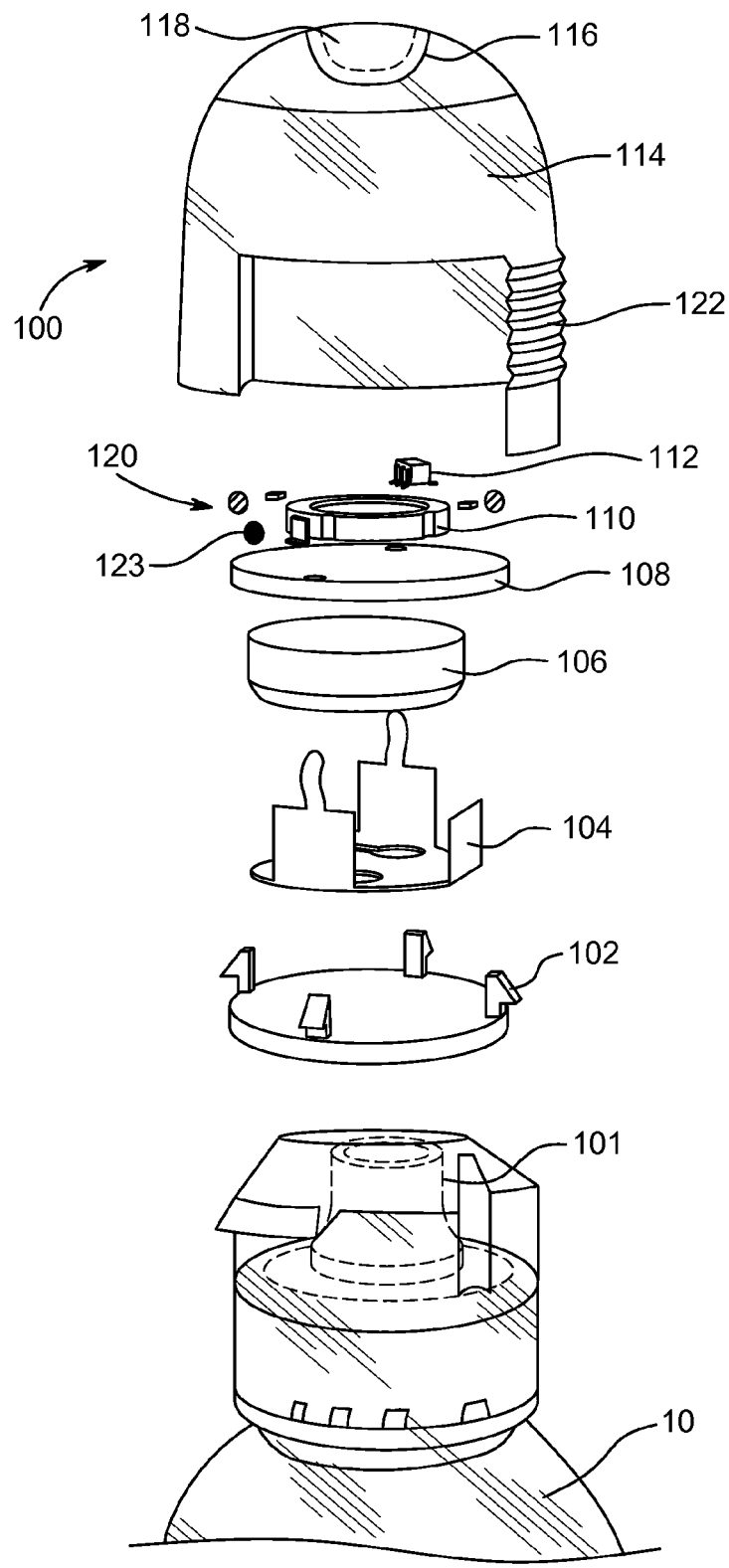
FIG. 1 illustrates an exploded view of a clip-on device attached to a cap of a container for reminding a user in accordance with a preferred embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF DRAWINGS

While this technology is illustrated and described in a preferred embodiment, a reminder system attached with a container, may be produced in different sizes, shapes and colors. This is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates an exploded view of a clip-on device 100 attached to a cap 101 of a container 10 for reminding a user in accordance with a preferred embodiment of the present invention. The clip-on device 100 includes a bottom cover 102 placed on the top of the cap 101 of the container 10, a battery holder 104 placed on top of the bottom cover 102.

The clip-on device 100 further includes a battery 106 placed inside the battery holder 104, a printed circuit board 108 attached to the battery holder 104, a button 110 placed on the printed circuit board 108, a controller 112 connected to the printed circuit board 108 for storing a reference time, a reference timeout value and generating reminding signals.

The clip-on device 100 further includes an upper cover 114 attached to the bottom cover 102 for housing the battery holder 104, the battery 106, the printed circuit board 108, the button 110, the controller 112. Further, the upper cover 114 includes an indent 116.

Further, the clip-on device 100 includes a tap button 118 placed in the indent 116 to meet the button 110 on receiving a tap from the user, at least one output unit 120 connected to the printed circuit board 108 to produce output signals on receiving reminding signals from the controller 112. Further the controller 112 stores the reference time on receiving the tap from the user.

The controller 112 generates the reminding signals for the user to drink from the container, when the user fails to tap the tap button 118 again in duration of the stored reference timeout value from the reference time. Further, the user partially removes the upper cover 114 to access the spout of the container.

In another preferred embodiment of the present invention, the tap button 118 facilitates the user to push the upper cover 114 to close the cap 101 of the container 10. Further, the clip-on device 100 includes one or more grooves 122 on the lower circumference to detachably attach the upper cover 114 to the container 10.

In another preferred embodiment of the present invention, the clip-on device 100 includes one or more sensors 123 connected to the printed circuit board 108 for sensing environmental conditions of the upper cover 114. Examples of the sensors 123 include but not limited to ultraviolet sensor, humidity sensor, touch sensor, temperature sensor and the light sensor.

Further, in the clip-on device 100 wherein the stored reference timeout value vary according to the environmental conditions of the upper cover 114 as sensed by the one or more sensors 123. For example, when the temperature is more than 35° C., the stored reference timeout value to send reminder signals is less than when the temperature is less than 35° C.

In another exemplary embodiment, in night, when the user is sleeping and there is no light, there would not be any reminder signal. However, as soon as the light sensor detects the light, the controller 112 starts the process of sending reminding signals. Further, when the user has not touched the upper cover 114 since long, then the controller 112 does not sends the reminder signals. However, on receiving the touch signal from the touch sensor, the controller 112 starts the process of sending reminding signals again.

Figure 2:
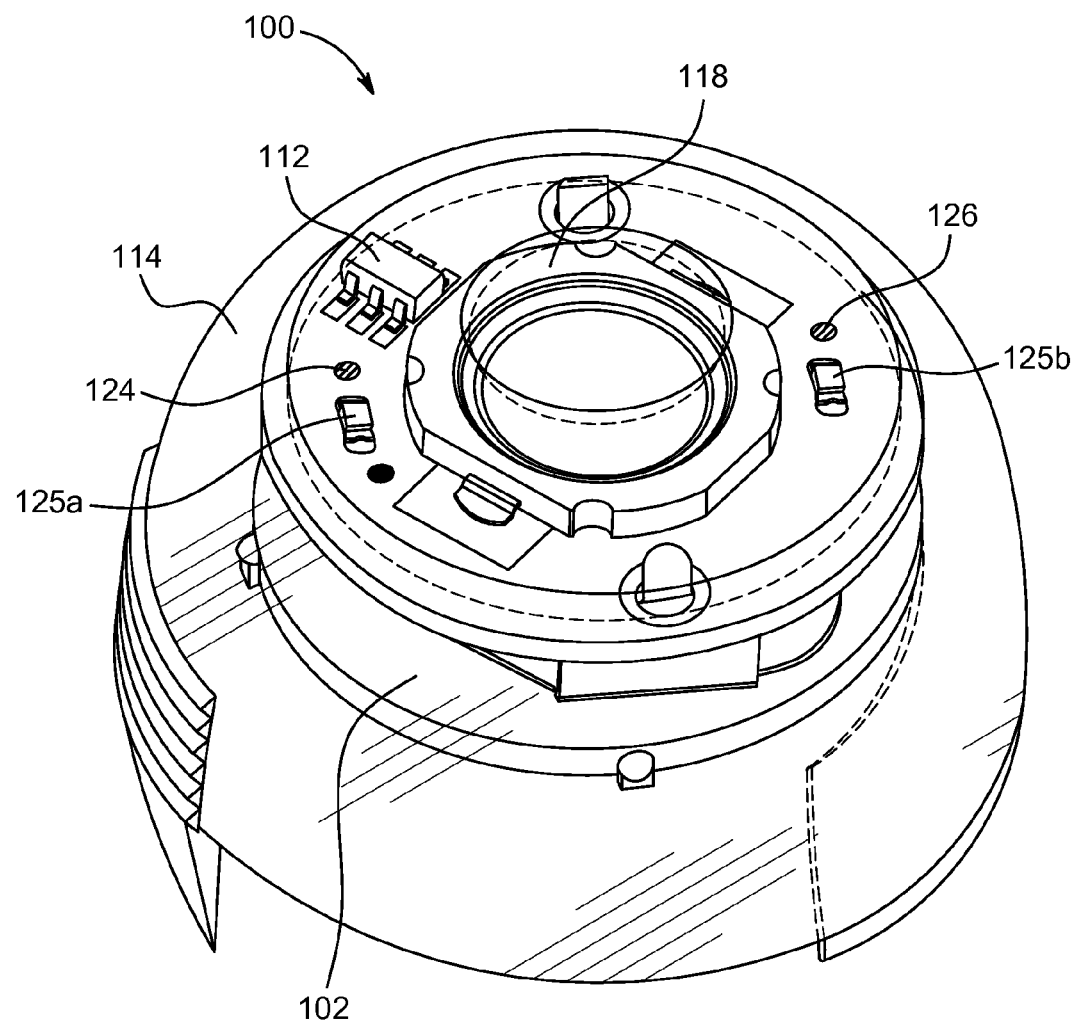
FIG. 2 illustrates a perspective view of the clip-on device in accordance with a preferred embodiment of the present invention.

FIG. 2 illustrates a perspective view of the clip-on device 100 in accordance with a preferred embodiment of the present invention. The tap button 118 is a touch sensitive sensor placed in the indent. Examples of the output unit 120 includes but not limited to an audio unit 124, one or more light emitting sources 125a and 125b, and a vibration unit 126. The audio unit 124 is connected to the printed circuit board (not shown in FIG. 2) to generate audio signals on receiving reminder signals from the controller 112.

The one or more light emitting sources 125a and 125b connected to the printed circuit board (not shown in FIG. 2) to illuminate on receiving reminder signals from the controller 112. The vibration unit 126 connected to the printed circuit board (not shown in FIG. 2) to produce vibration signals on receiving reminder signals from the controller 112.

In another preferred embodiment of the present invention, the electrical circuit of the clip-on device 100 is printed on the upper housing 114 or the bottom cover 102. The upper housing 114 may be made of plastic, however it would be readily apparent to those skilled in the art that various types of material may be envisioned without deviating from the scope of the present invention.

In another preferred embodiment of the present invention, the controller 112 releases reminding signals to increase the intensity of the output signals, when the duration of receiving tap on the tap button 118 from the user exceeds the stored reference timeout value. For exemplary purposes, the intensity of the output signals may result in increase in the frequency of the signals released from the output unit. Further, the intensity may relates to high intense notifications such as higher volume of the sound, increase in length of vibrations, and high light brightness.

Figure 3:
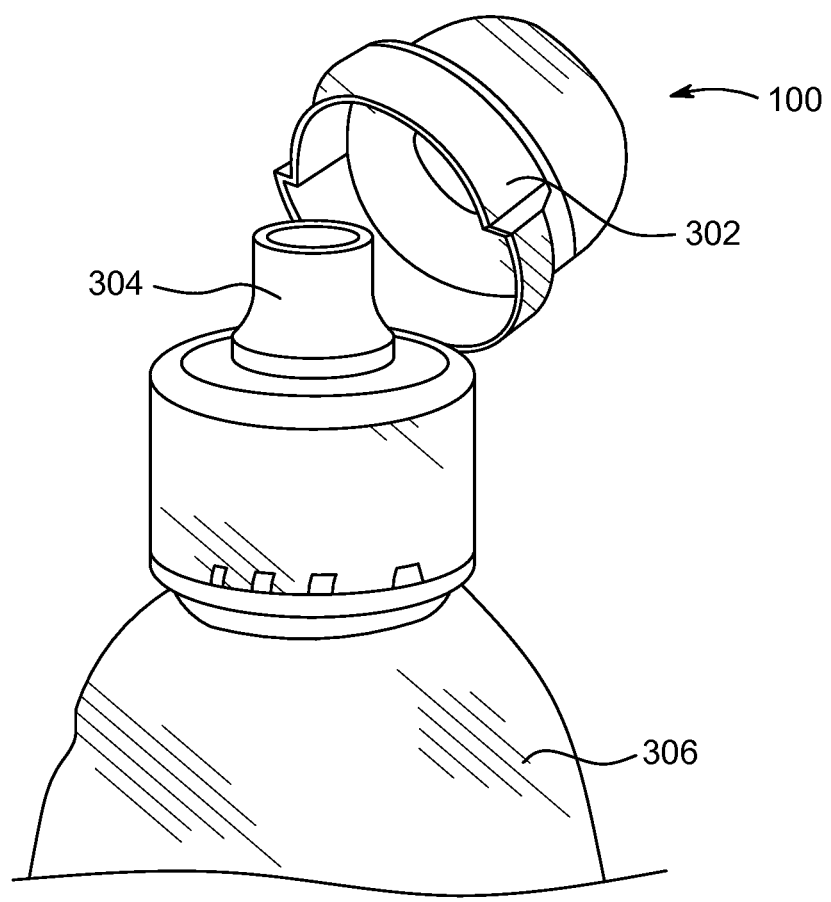
FIG. 3 illustrates a perspective view of the clip-on device attached to the cap of the container in accordance with a preferred embodiment of the present invention.

FIG. 3 illustrates a perspective view of the clip-on device 100 attached to the cap 302 of the container 306 in accordance with a preferred embodiment of the present invention. In order to drink from the container 306, the user opens the cap 302, resulting in opening of the attached clip-on device 100. The cap 302 and the clip-on device 100 are partially pivotally removed to allow the user to access spout 304 of the container 306.

Figure 4:
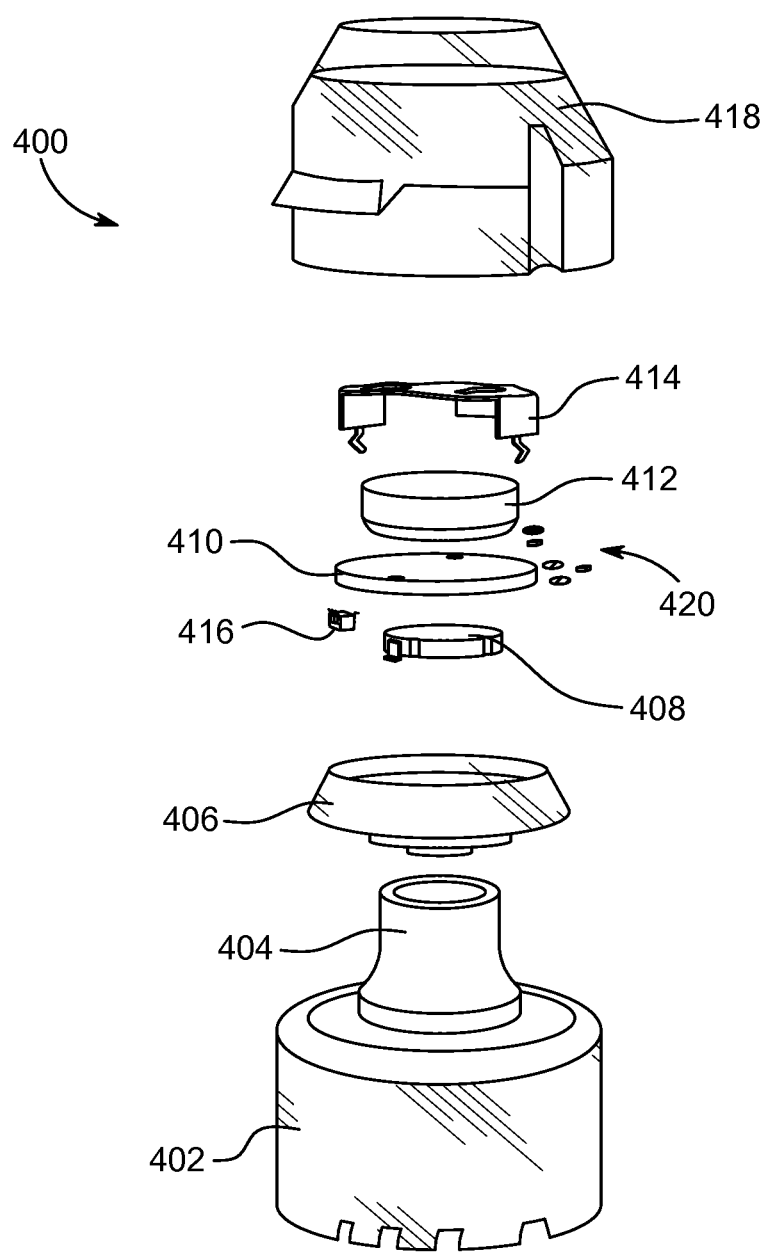
FIG. 4 illustrates another exploded view of an in-clip device detachably attached to the container in accordance with a preferred embodiment of the present invention.

FIG. 4 illustrates another exploded view of an in-cap device 400 detachably attached to the container 402 having a spout 404 for reminding a user in accordance with another preferred embodiment of the present invention. The in-cap device 400 includes a hollow sealing lock 406 receiving the spout 404 from the hollow portion, a button 408 placed inside the hollow portion of the hollow sealing lock 406 to meet the spout 404, a printed circuit board 410 placed on the button 408.

Further, the in-cap device 400 includes a battery 412 connected to the printed circuit board 410, a battery holder 414 for holding the battery 412, a controller 416 connected to the printed circuit board 410 for storing a reference time when the user closes the hollow sealing lock 406 to allow the button 408 to meet the spout 404. Further, the controller 416 storing a reference timeout value and generating reminding signals.

Further, the in-cap device 400 includes an upper cover 418 attached to the container 402 for housing the spout 404, the hollow sealing lock 406, the battery holder 414, the battery 412, the printed circuit board 410 and the button 408. Further, the in-cap device 400 includes an output unit 420 connected to the printed circuit board 410 for producing output signals on receiving reminding signals from the controller 416. The output unit 420 is explained in detailed in conjunction with FIG. 5 of the present invention.

The controller 416 generates reminding signals when the user fails to remove the hollow sealing lock 406 along with the button 408 from the spout 404 again in duration of the stored reference timeout value from the reference time. Further, the user removes the upper cover 418 along with the hollow sealing lock 406 to access the spout 404 for drinking from the container 402.

In another preferred embodiment of the present invention, the controller 416 releases reminding signals to increase the intensity of the output signals, when the duration of removing the button 408 from the spout 404 exceeds the stored reference timeout value. For exemplary purposes, the intensity of the output signals may result in increase in the frequency of the signals released from the output unit. Further, the intensity may relates to high intense notifications such as higher volume of the sound, increase in length of vibrations, and high light brightness.

Figure 5:
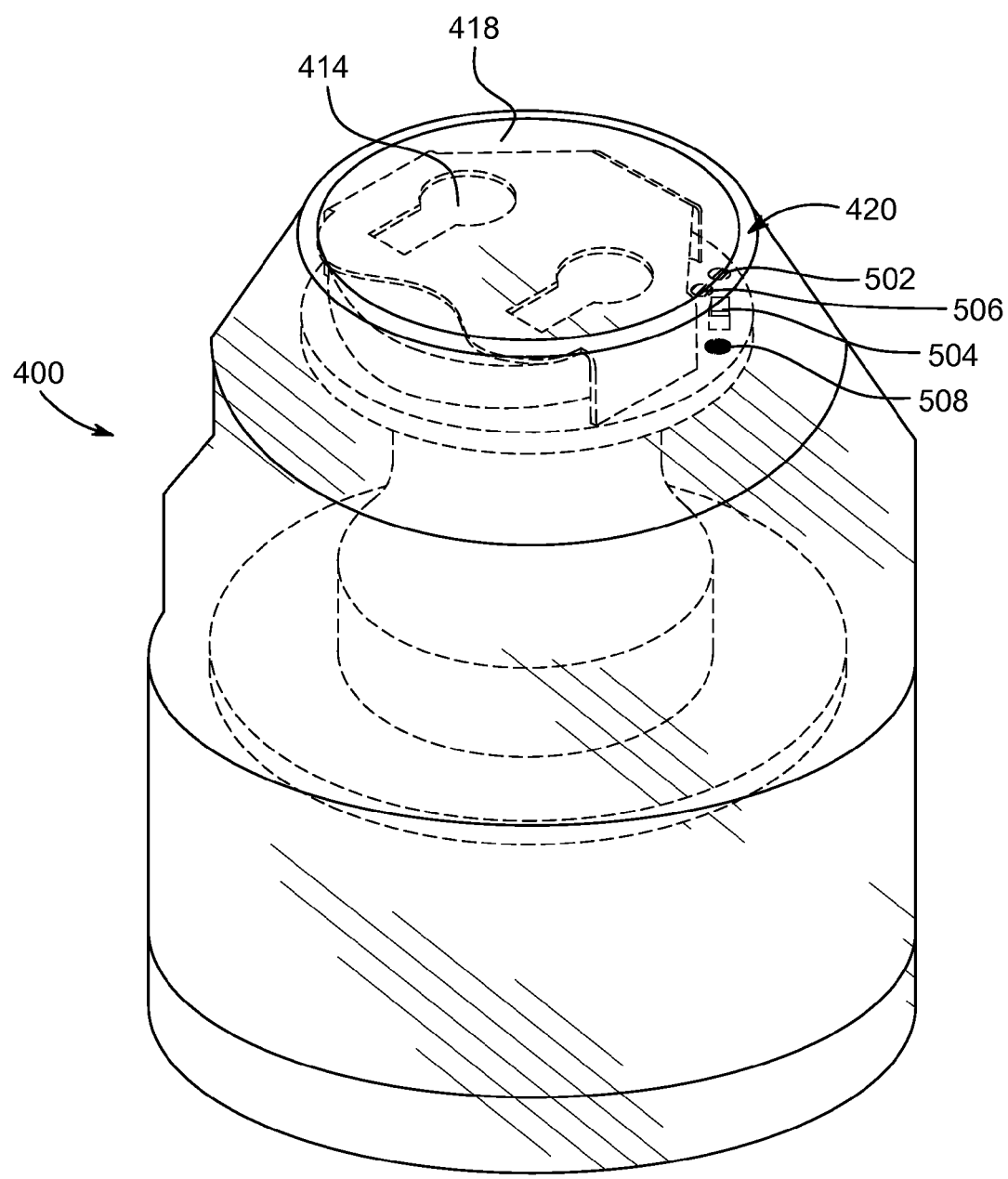
FIG. 5 illustrates another perspective view of the in-clip device in accordance with another preferred embodiment of the present invention.

FIG. 5 illustrates another perspective view of the in-clip device 400 in accordance with another preferred embodiment of the present invention. Examples of the output unit 420 include but not limited to an audio unit 502, one or more light emitting sources 504 and 125b, and a vibration unit 506. The audio unit 502 is connected to the printed circuit board (not shown in FIG. 5) to generate audio signals on receiving reminder signals from the controller (not shown in FIG. 5).

The one or more light emitting sources 504 connected to the printed circuit board (not shown in FIG. 5) to illuminate on receiving reminder signals from the controller (not shown in FIG. 5). The vibration unit 506 connected to the printed circuit board (not shown in FIG. 5) to produce vibration signals on receiving reminder signals from the controller (not shown in FIG. 5).

The in-cap device 400 further includes one or more sensors 508 connected to the printed circuit board 108 for sensing environmental conditions reflecting on the upper cover 418. Examples of the sensors 508 include but not limited to ultraviolet sensor, humidity sensor, touch sensor, temperature sensor and the light sensor.

Further, in the in-cap device 400 wherein the stored reference timeout value vary according to the environmental conditions of the upper cover 418 as sensed by the one or more sensors 508. For example, when the temperature is more than 35° C., the stored reference timeout value to send reminder signals is less than when the temperature is less than 35° C.

In another exemplary embodiment, in night, when the user is sleeping and there is no light, there would not be any reminder signal. However, as soon as the light sensor detects the light, the controller (not shown in FIG. 5) starts the process of sending reminding signals.

Further, in another preferred embodiment of the present invention, the in-cap 400 includes a touch sensitive sensor 510 placed on the battery holder 414 for receiving a tap from the user for closing the upper cover 418 against the container (not shown in FIG. 5).

Figure 6:
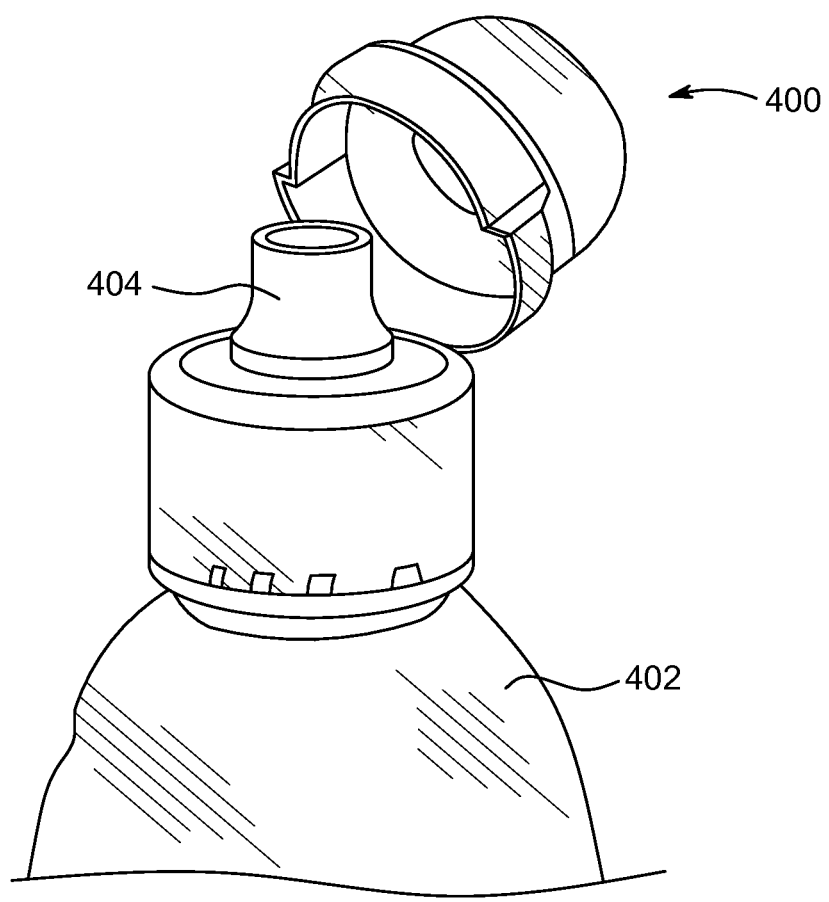
FIG. 6 illustrates a perspective view of the in-cap device attached to the container in accordance with a preferred embodiment of the present invention.

FIG. 6 illustrates a perspective view of the in-cap device 400 attached to the container 402 in accordance with a preferred embodiment of the present invention. In order to drink from the spout 404, the user opens the in-cap device 400 which is pivotally attached to the container 402.

The present invention offers various advantages such as to remind people of the need to regularly and consistently drink water which is important for the people's health. The present invention focus on monitoring the behavior of the user and reminding to drink is purely on the behavior of the user. The user needs not to perform any extra activities to have a balance liquid intake for the body.

There has thus been shown and described a reminder system configured with a container. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A clip-on device attached to a cap of a container for reminding a user, the clip-on device comprising:
   a bottom cover placed on top of the cap of the container;
   a battery holder placed on top of the bottom cover; a battery placed inside the battery holder; a printed circuit board attached to the battery holder; a button placed on the printed circuit board;
   a controller connected to the printed circuit board for storing a reference time, a reference timeout value and generating reminding signals;
   at least one output unit connected to the printed circuit board to produce output signals on receiving reminding signals from the controller;

an upper cover attached to the bottom cover for housing the battery holder, the battery, the printed circuit board, the button, the controller and the output unit; further the upper cover including an indent; and a tap button placed in the indent to meet the button on receiving a tap from the user, wherein the controller stores the reference time on receiving the tap from the user;

wherein the controller generates the reminding signals for the user to drink from the container, when the user fails to tap the tap button again in duration of the stored reference timeout value from the reference time;

wherein the user partially removes the upper cover to drink from the container.

2. The clip-on device according to claim 1 wherein the tap button further facilitates the user to push the upper cover to close the cap of the container.

3. The clip-on device according to claim 1 further comprising one or more grooves on a lower circumference to detachably attach the upper cover to the container.

4. The clip-on device according to claim 1 further comprising one or more sensors connected to the printed circuit board for sensing environmental conditions of the upper cover.

5. The clip-on device according to claim 4 wherein the stored reference timeout value is based on the environmental conditions reflecting on the upper cover as sensed by the one or more sensors.

6. The clip-on device according to claim 1 wherein the output unit comprising at least one of:

an audio unit connected to the printed circuit board to generate audio signals on receiving reminder signals from the controller;

one or more light emitting sources connected to the printed circuit board to illuminate on receiving reminder signals from the controller; and a vibration unit connected to the printed circuit board to produce vibration signals on receiving reminder signals from the controller.

7. The clip-on device according to claim 1 wherein an intensity of the output signals increases when the duration of receiving tap on the tap button from the user exceeds the stored reference timeout value.

8. An in-cap device detachably attached to a container having a spout for reminding a user, the in-cap device comprising:

a hollow sealing lock receiving the spout from a hollow portion;

a button placed inside the hollow portion of the hollow sealing lock to meet the spout;

a printed circuit board placed on the button;

a battery connected to the printed circuit board; a battery holder for holding the battery;

a controller connected to the printed circuit board for storing a reference time when the user closes the hollow sealing lock to allow the button to meet the spout, further storing a reference timeout value and generating reminding signals;

an upper cover attached to the container for housing the spout, the hollow sealing lock, the battery holder, the battery, the printed circuit board and the button; and an output unit connected to the printed circuit board for producing output signals on receiving reminding signals from the controller;

wherein, the controller generates reminding signals when the user fails to remove the sealing lock along with the button from the spout again in duration of the stored reference timeout value from the reference time;

wherein the user removes the upper cover along with the hollow sealing lock to access the spout for drinking from the container.

9. The in-cap device according to claim 8 further comprising one or more sensors for sensing environmental conditions of the upper cover.

10. The in-cap device according to claim 9 wherein the stored reference timeout value depending on the environmental conditions reflecting on the upper cover as sensed by the one or more sensors.

11. The clip-on device according to claim 9 wherein the output unit comprising at least one of:

an audio unit connected to the printed circuit board to generate audio signals on receiving reminder signals from the controller;

one or more light emitting sources connected to the printed circuit board to illuminate on receiving reminder signals from the controller; and a vibration unit connected to the printed circuit board to produce vibration signals on receiving reminder signals from the controller.

12. The in-cap device according to claim 8 wherein an intensity of the output signals increases when the duration of removing the button from the spout exceeds the stored reference timeout value.

* * * * *